(12) United States Patent
Reilly

(10) Patent No.: US 10,732,998 B2
(45) Date of Patent: Aug. 4, 2020

(54) METHOD, USER DEVICE AND SYSTEM FOR DYNAMICALLY MODIFYING A USER INTERFACE WITHIN A DEPLOYED APPLICATION

(71) Applicant: GRAD DNA LTD., Kent (GB)

(72) Inventor: Stephen Reilly, Kent (GB)

(73) Assignee: GRAD DNA LTD, Kent (GB)

( * ) Notice: Subject to any disclaimer, the term of this patent is extended or adjusted under 35 U.S.C. 154(b) by 29 days.

(21) Appl. No.: 16/048,682

(22) Filed: Jul. 30, 2018

(65) Prior Publication Data

US 2019/0034212 A1 Jan. 31, 2019

Related U.S. Application Data

(60) Provisional application No. 62/538,943, filed on Jul. 31, 2017.

(51) Int. Cl.
*G06F 9/451* (2018.01)
*G06F 3/0484* (2013.01)
*G06F 3/0482* (2013.01)
*H04L 12/24* (2006.01)
*G06F 8/38* (2018.01)

(52) U.S. Cl.
CPC .......... *G06F 9/451* (2018.02); *G06F 3/0482* (2013.01); *G06F 3/0484* (2013.01); *G06F 8/38* (2013.01); *H04L 41/0266* (2013.01); *H04L 41/0816* (2013.01); *H04L 41/18* (2013.01); *H04L 41/22* (2013.01)

(58) Field of Classification Search
CPC ...... G06F 9/451; G06F 3/0484; G06F 3/0482; H04L 41/0816
See application file for complete search history.

(56) References Cited

U.S. PATENT DOCUMENTS

| | | | |
|---|---|---|---|
| 7,263,662 B1 * | 8/2007 | Ballard | G06F 3/023 707/999.102 |
| 9,396,232 B1 * | 7/2016 | Kapoor | G06F 16/24564 |
| 9,454,576 B1 * | 9/2016 | Kapoor | G06F 16/24564 |
| 9,454,577 B1 * | 9/2016 | Kapoor | G06F 16/24564 |
| 9,720,707 B1 * | 8/2017 | Shook | G06F 9/451 |
| 9,922,308 B2 * | 3/2018 | Mudler | G06Q 10/06 |

(Continued)

*Primary Examiner* — Shourjo Dasgupta
(74) *Attorney, Agent, or Firm* — Nixon & Vanderhye, P.C.

(57) ABSTRACT

The present invention relates to a method for dynamically modifying the user interface of a deployed application. The method including: a deployed application executing on a user device in accordance with pre-stored configuration data to provide at least part of the user interface; and the deployed application receiving modified configuration data from a server. The at least part of the user interface may be modified in accordance with received modified configuration data. The present invention also relates to a method for dynamically modifying the user interface of a deployed application. The method includes a deployed application executing on a device in accordance with pre-stored configuration data to provide at least part of the user interface; and the deployed application modifying at least part of the user interface in response to user input. The at least part of the user interface may be user interface navigation data. A user device and system are also disclosed.

19 Claims, 8 Drawing Sheets

(56) References Cited

U.S. PATENT DOCUMENTS

| | | | |
|---|---|---|---|
| 2007/0127426 A1* | 6/2007 | Watters | H04L 67/125 370/338 |
| 2010/0100427 A1* | 4/2010 | McKeown | G06Q 10/067 705/322 |
| 2010/0153288 A1* | 6/2010 | Digiambattista | G06Q 10/1053 705/319 |
| 2010/0269152 A1* | 10/2010 | Pahlavan | H04L 63/08 726/3 |
| 2013/0046704 A1* | 2/2013 | Patwa | G06Q 10/06 705/321 |
| 2013/0097093 A1* | 4/2013 | Kolber | G06Q 10/1053 705/321 |
| 2014/0156333 A1* | 6/2014 | Olivier | G06Q 10/1095 705/7.19 |
| 2014/0156356 A1* | 6/2014 | Olivier | G06Q 10/06398 705/7.36 |
| 2014/0156550 A1* | 6/2014 | Olivier | G06Q 10/1053 705/321 |
| 2014/0180947 A1* | 6/2014 | Baeck | G06Q 10/1053 705/321 |
| 2015/0332200 A1* | 11/2015 | Bernaudin | G06F 3/0481 705/7.42 |
| 2016/0241676 A1* | 8/2016 | Armstrong | G06F 16/2358 |
| 2017/0011325 A1* | 1/2017 | Hanna | G06Q 10/06 |
| 2019/0019159 A1* | 1/2019 | Champaneria | G06Q 10/1053 |

* cited by examiner

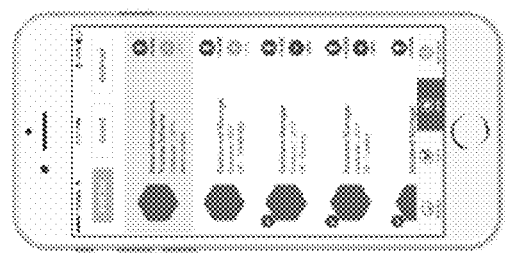
Figure 5c
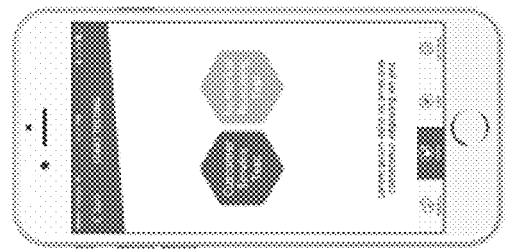
Figure 5b
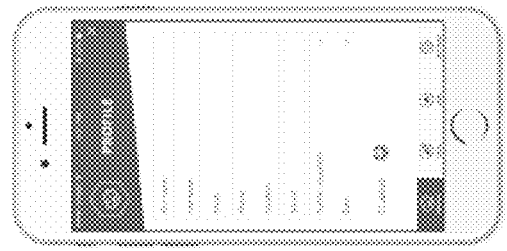
Figure 5a
Figure 5d

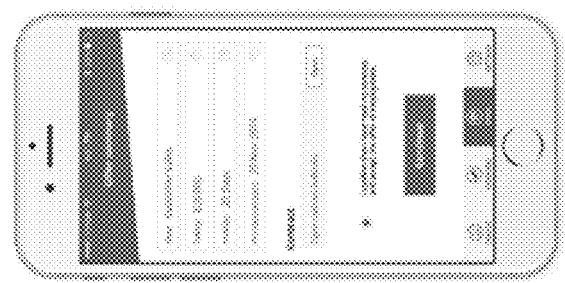
Figure 7c
Figure 7b
Figure 7a

METHOD, USER DEVICE AND SYSTEM FOR DYNAMICALLY MODIFYING A USER INTERFACE WITHIN A DEPLOYED APPLICATION

This application claims benefit of U.S. Provisional Application No. 62/538,943 filed Jul. 31, 2017, the entire contents of which are hereby incorporated by reference.

FIELD OF INVENTION

The present invention is in the field of controlling deployed software. More particularly, but not exclusively, the present invention relates to the dynamic modification of user interfaces in deployed applications.

BACKGROUND

User interfaces exist to facilitate interaction between a user and a software application. Typically, software developers have envisaged that the user interface should remain static to reduce confusion for the user and to make the application easier to learn.

However, this adherence to static user interfaces results in reduced functionality, particularly, in mobile applications where it may be advantageous to evolve the user interface for a specific user to provide additional functionality whilst accommodating the limitations of a reduced screen space to display the user interface.

It is an object of the present invention to provide a method, user device and system to dynamically modify the user interface of deployed applications which overcomes the disadvantages of the prior art, or at least provides a useful alternative.

SUMMARY OF INVENTION

According to a first aspect of the invention there is provided a method for dynamically modifying the user interface of a deployed application, including: a deployed application executing on a user device in accordance with pre-stored configuration data to provide at least part of the user interface; and the deployed application receiving modified configuration data from a server; wherein the at least part of the user interface is modified in accordance with received modified configuration data.

The server may coordinate modification of the configuration data by one of a plurality of user control devices. The server may provide a plurality of options to the one user control device and the server may receive selection of one of the options to create the modified configuration data.

The at least part of the user interface may include content data. The content data may be HTML data requested from one of a plurality of web servers.

The at least part of the user interface may include user interface navigation data. The navigation data may be visually represented as a taskbar. The navigation data may include one stage of a series of stages and the modified configuration data may relate to a second stage following the one stage. The deployed application may be executing on a plurality of devices for a plurality of users, the first stage of the series of stages may be provided to the plurality of users, and each subsequent stage of the series of stages may be provided to a subset of users of the preceding stage. The series of stages may relate to a recruitment and training journey within an organisation.

The configuration data may include defining the toggling on or off of pre-stored elements/functionality at the device.

The deployed application may be a native app.

The device may be a mobile user device.

The deployed application may be a human resources application.

According to a further aspect of the invention there is provided a method for dynamically modifying the user interface of a deployed application, including:

a) a deployed application executing on a device in accordance with pre-stored configuration data to provide at least part of the user interface; and b) the deployed application modifying at least part of the user interface in response to user input;

wherein the at least part of the user interface is user interface navigation data.

Other aspects of the invention are described within the claims.

BRIEF DESCRIPTION OF THE DRAWINGS

Embodiments of the invention will now be described, by way of example only, with reference to the accompanying drawings in which:

FIGS. 5a, 5b, 5c, and 5d: show screenshots of a user interface illustrating a method in accordance with an embodiment of the invention;

FIGS. 7a, 7b, and 7c: show screenshots of a user interface illustrating a method in accordance with an embodiment of the invention.

DETAILED DESCRIPTION OF PREFERRED EMBODIMENTS

The present invention provides a method, user device and system for dynamically modifying the user interface of a deployed application.

The inventor has discovered that it would be useful to enable a third party to control the functionality of a user interface for a deployed application. The inventor has discovered that the user interface at an application deployed at a user's device can be modified by transmitting new configuration data from a server.

The inventor has also discovered that the user interface of a deployed application at the device can also be modified in response to user input at the device.

Figure 1:
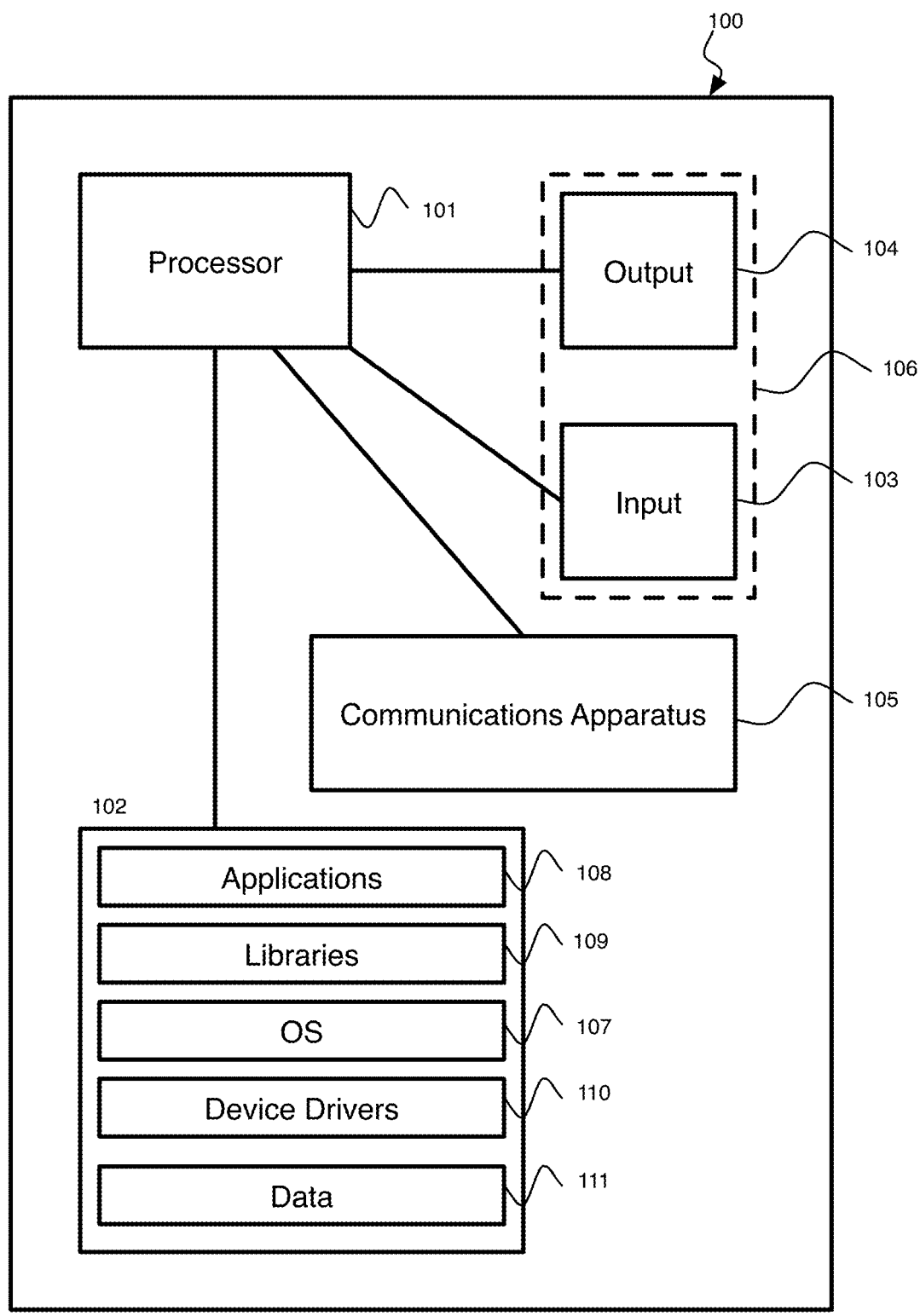
FIG. 1: shows a block diagram illustrating a user device in accordance with an embodiment of the invention.

In FIG. 1, a user device 100 in accordance with an embodiment of the invention is shown.

The device 100 includes a processor 101, a memory 102, an input apparatus 103, and a display apparatus 104. The device may also include a communications apparatus 105.

The input apparatus 103 may include one or more of a touch/near-touch input, an audio input, a keyboard, a pointer device (such as a mouse), or any other type of input. The touch input may include 3D touch. 3D touch inputs detect varying degrees of pressure.

The display apparatus 104 may include one or more of a digital screen (such as an LED or OLED screen), an e-ink screen, or any other type of display.

The input and display apparatuses 103 and 104 may form an integrated user interface 106 such as a touch or near-touch screen.

The device 100, or at least parts of the device, may constitute a mobile device, such as a smart-phone, a tablet, or a smartwatch. The mobile device 100 may include a common operating system 107 such as Apple iOS, Google Android, or Microsoft Windows Phone. In other embodiments, the device 100 may be a desktop or laptop computer, or another user device such as a single-purpose computing apparatus.

In some embodiments, the device 100 may be configured to provide multi-functionality such as execution of one or more software applications 108, transmitting and receiving communications (e.g. voice communications, text messages, notifications, or any other network communications), and/or monitoring communications or applications and generating notifications. The multi-functionality may be coordinated by the operating system 107 executing on the device 100.

The processor 101 may be configured to display a user interface based upon pre-stored configuration data. The memory 102 may be configured to store the configuration data. The user interface may include a user interface navigation element based upon user interface navigation data which may be included within the pre-stored configuration data. The user interface navigation element may include a plurality of options and/or nested options.

The processor 101 may be configured to modify the user interface based upon modified configuration data. For example, the user interface navigation data may be modified to result in a different user interface navigation element. In embodiments, the configuration data may be modified based at least in part upon receipt of modified data from a server.

In embodiments, the processor may modify the user interface based at least in part in response to a user input at input apparatus 103.

The memory 102 may be further configured to store the software applications 108, libraries 109, the operating system 107, device drivers 110, and data 111.

The processor 101 is configured to execute the software applications 108, libraries 109, operating system 107, and device drivers 110, and to retrieve data 111.

The communications apparatus 105 may be configured to communicate with one or more other devices or servers via a communications interface such as wifi, Bluetooth, and/or cellular (e.g. 2G, 3G, or 4G) and/or across a network (such as a cellular network, a private LAN/WLAN and/or the Internet).

Figure 2:
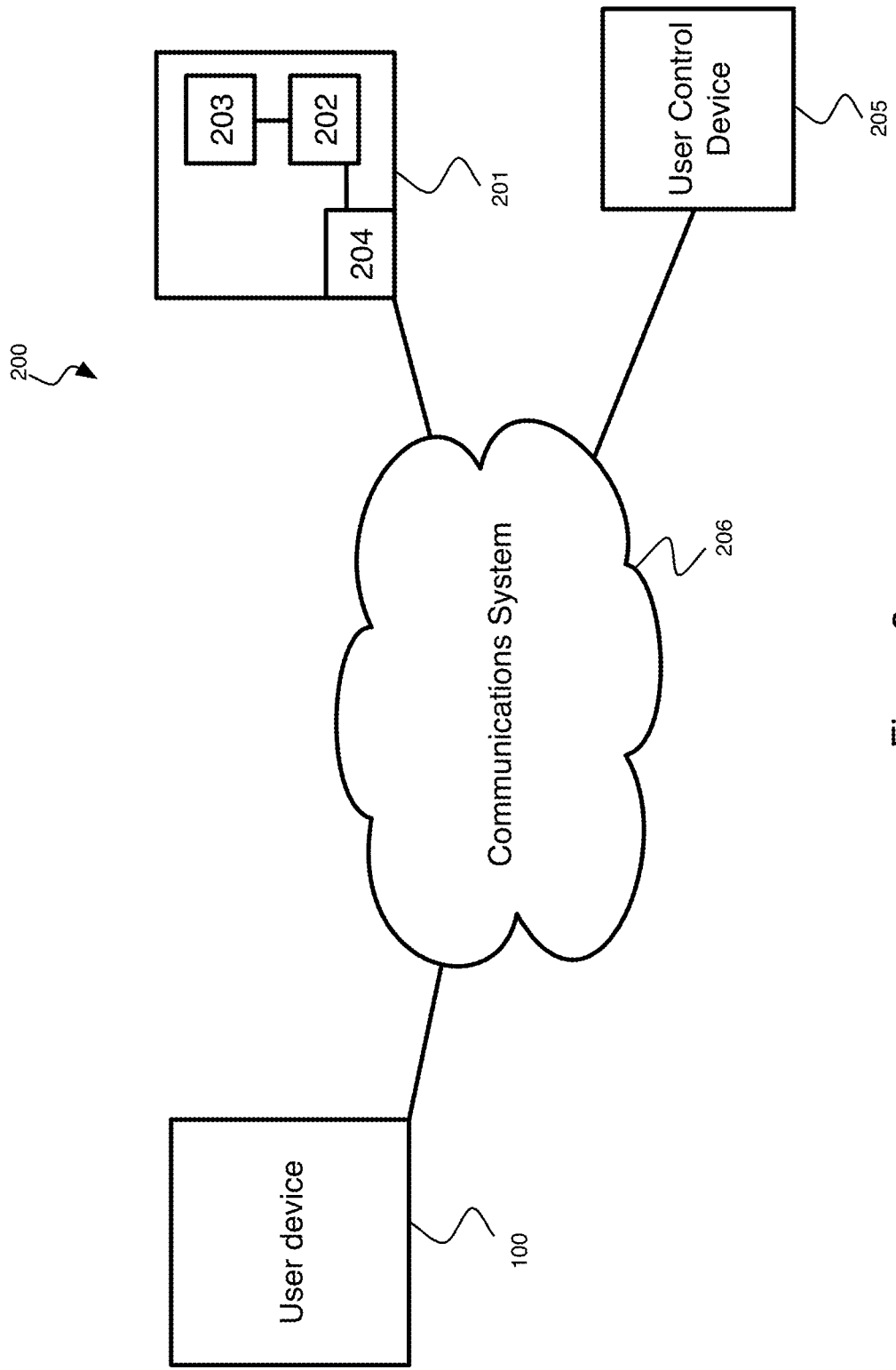
FIG. 2: shows a block diagram illustrating a system in accordance with an embodiment of the invention.

In FIG. 2, a system 200 in accordance with an embodiment of the invention is shown.

The system may include a user device 100 as described in FIG. 1.

The system may also include a server 201. The server may include a processor 202, a memory 203, and a communication apparatus 204.

The memory 203 may be configured to store configuration data for an application deployed at each of a plurality of user devices, including user device 100.

The server 201 may be configured to receive instructions from a user control device 205 to modify configuration data for one or more of the deployed applications.

The server 201 may transmit the modified configuration data to one or more of the user devices (e.g. 100) deploying the application.

In one embodiment, the server 201 modifies the configuration data not based upon instructions from another device 205 but based upon a status change in relation to the corresponding user device (such as user device 100). The status change may relate to a user of the deployed application at that device (e.g. 100) and may be driven by a user action at that device (e.g. 100) and/or via a set of rules at the server 201.

The system may also include a communications system 206. The communications system may be a network, combination of networks or internetwork (such as the Internet). The user device 100 may be configured to communicate with the server 201 via the communications apparatus 105 through the communications system 206.

Figure 3:
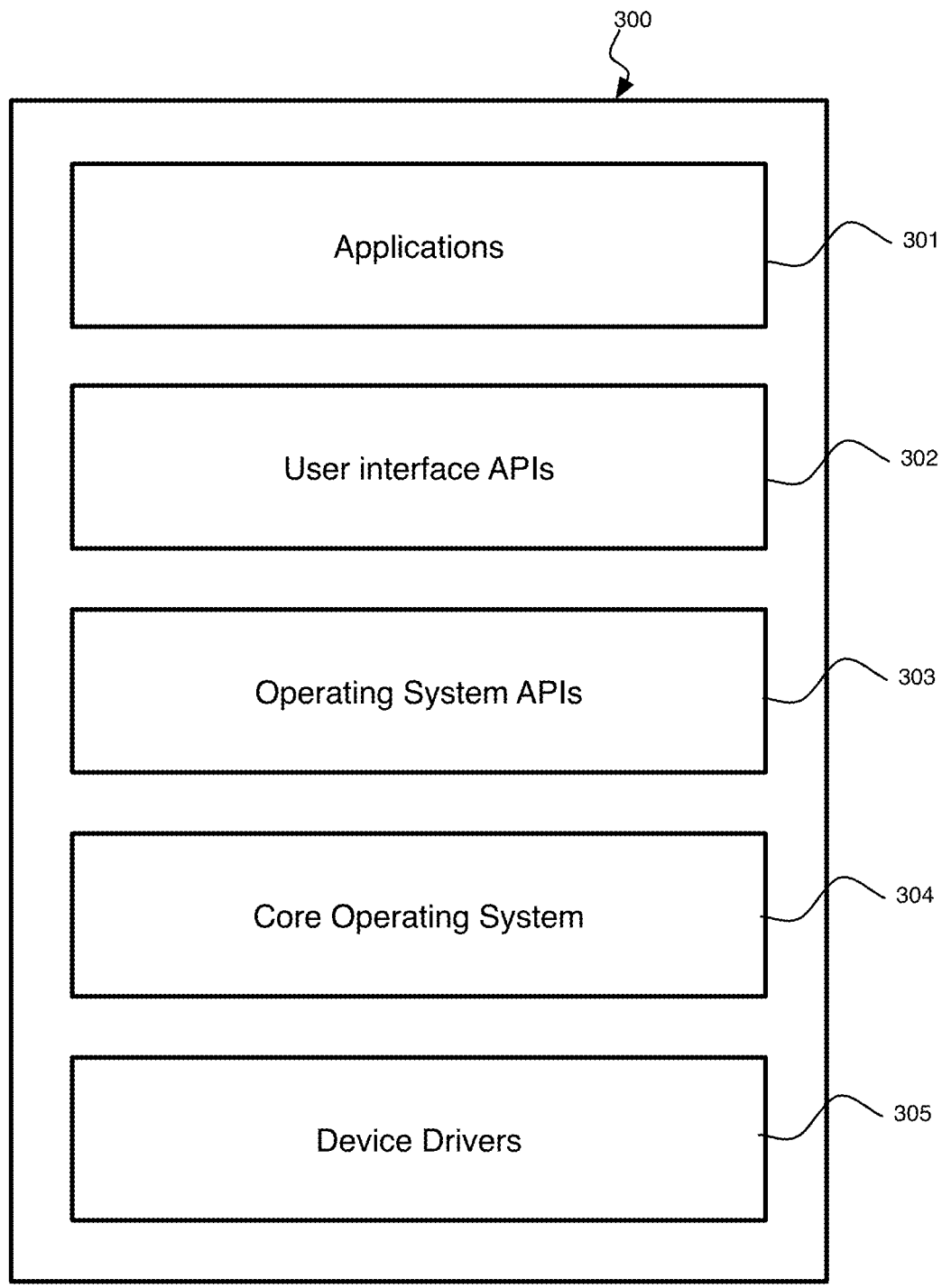
FIG. 3: shows a block diagram illustrating a software architecture for user device in accordance with an embodiment of the invention.

FIG. 3 shows a software architecture 300 for use with a user device 100 of FIG. 1.

Software applications 301 are provided at a top layer. Below this layer are user interface APIs 302 which provide access for the application software 301 to user interface libraries. Below this layer are operating system APIs 303 which provide access for the application software 301 and user interface libraries to the core operating system 304. Below the core operating system 304 are the device drivers 305 which provide access to the input 103, output 104, and communication 105 apparatuses.

Figure 4:
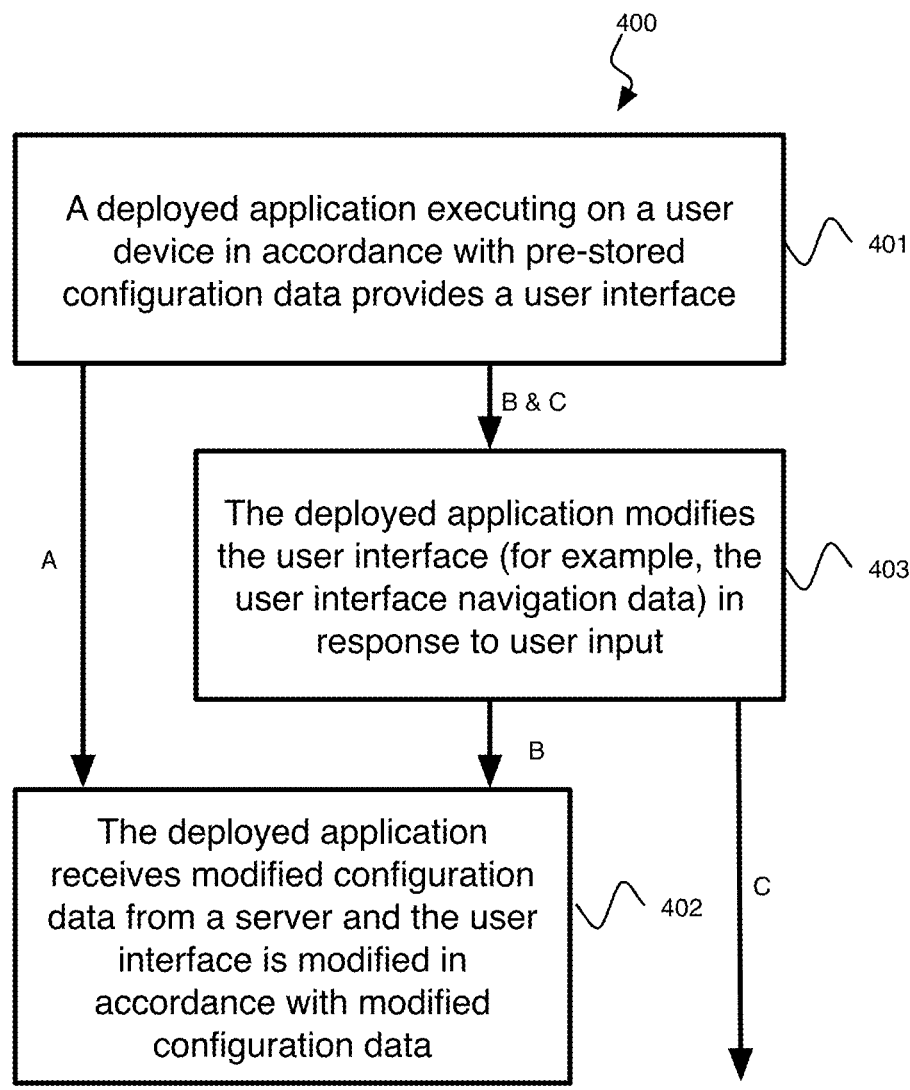
FIG. 4: shows a flow diagram illustrating a method in accordance with an embodiment of the invention.

FIG. 4 describes a method 400 for dynamically modifying the user interface of a deployed application in accordance with embodiments of the invention.

The deployed application may be a native application, and may be a human resources application.

In step 401, a deployed application executes on a user device (e.g. 100) in accordance with pre-stored configuration data to provide at least part of the user interface.

The user device may be a mobile user device.

At least part of the user interface may include content data. The content data may be HTML requested from one of a plurality of web servers.

At least part of the user interface includes user interface navigation data. The navigation data may be visually represented by a taskbar user interface element.

The configuration data may include definition of toggling on/off of pre-stored elements or functionality at the user device.

In step 402 (and following flow A or B), the deployed application may receive modified configuration data from a server (e.g. 201). The at least part of the user interface may be modified in accordance with the received modified configuration data.

The server may coordinate modification of the configuration data using a user control device (e.g. 205). The user control device may be one of many such devices. Options may be presented to the user control device for selection by a user of the user control device, and the selected option may determine the modifications to the configuration data.

The configuration data may be modified for a deployed application at a plurality of user devices, or for a deployed application at only one of the plurality of user devices. In the latter way, the deployed application may be modified in a specific way for a specific user (e.g. a user of device 100).

The user interface navigation data may include one stage of a series of stages and the modified configuration data may relate to a second stage following a first stage. The deployed application may be executing on a plurality of users devices for each of a plurality of users, and the first stage of the series of stages may be provided to each of the plurality of users. Each subsequent stage of the series of stages may be provided only to a subset of users of the preceding stage. The series of stages could, for example, relate to a recruitment and training journey within an organisation.

Alternatively (following flow C), or additional (following flow B), and in step 403, the deployed application may modify at least part of the user interface in response to user input. The at least part of the user interface may be user interface navigation data.

FIGS. 5*a* to 8*d* show a series of screenshots which illustrate a method for dynamically modifying the user interface of a deployed application in accordance with embodiments of the invention.

The deployed application is a human resources application.

The application is shown in FIGS. 5*a* to 8*d* executing on a user's device (e.g. user device 100).

FIGS. 5*a* to 5*d* illustrate the deployed application executing during a first stage of a series of stages. The deployed application uses pre-stored configuration data to generate a profile module (shown in FIG. 5*a*), a testing module (shown in FIG. 5*b*), and a jobs module (shown in FIG. 5*c*). A taskbar is displayed at the bottom of each of those modules. The taskbar is shown as a user interface element in FIG. 5*d*. The user interface element visually displays user interface navigation data to enable a user to move between one of a plurality of modules: profile, testing, jobs, and settings. Each module providing or displaying content to the user. The content being interactive content.

A user may enter information about themselves in the profile module, sit a test in the testing module and select a job in the jobs module.

In this example, once the user has performed all the above, the information, the test and the selected job are transmitted to a server (e.g. server 201). The server may, based upon rules or selection of another user at a user control device (e.g. 205), modify the configuration data for the deployed application at this user's device. The modified configuration data includes changes to the user interface navigation data.

Figure 6C:
FIGS. 6a, 6b, and 6c: show screenshots of a user interface illustrating a method in accordance with an embodiment of the invention.
Figure 6B:
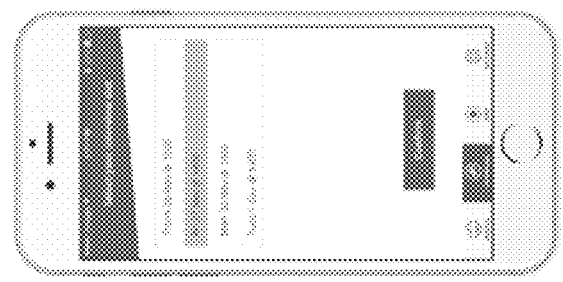
Figure 6A:
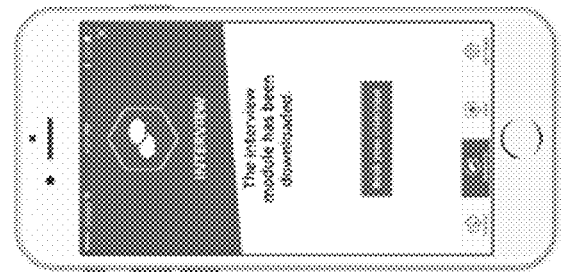
Figure 8D:
FIGS. 8a, 8b, 8c, and 8d: show screenshots of a user interface illustrating a method in accordance with an embodiment of the invention.
Figure 8C:
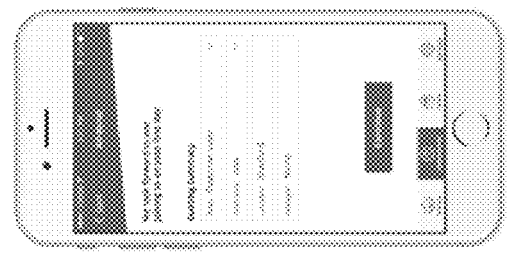
Figure 8B:
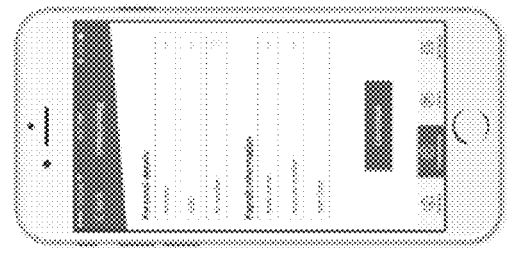
Figure 8A:
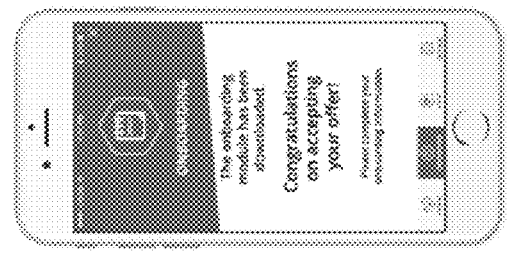

FIGS. 6*a* to 6*c* illustrate the deployed application executing during a second stage of a series of stages in accordance with modified configuration data received from the server. The deployed application uses the modified configuration data to generate an interview module. The module comprises the display of a download screen to indicate that modified data has been received (shown in FIG. 6*a*), and an interview time selection screen (shown in FIG. 6*b*). A taskbar is displayed at the bottom of each of those screens. The taskbar is shown as a user interface element in FIG. 6*c*. The user interface element visually displays new user interface navigation data to enable a user to move between one of a plurality of modules: profile, interview, jobs, and settings. It can be seen that the user interface navigation data has changed between the first and second stages.

In this example, the user has been interviewed by a company in accordance with the interview and job selected, and a company representative utilising a user control device has selected an option to make a job offer to the user. This option is received by the server (e.g. 201) to modify the configuration data again.

FIGS. 7*a* to 7*c* illustrate the deployed application executing during a third stage of a series of stages in accordance with second modified configuration data received from the server. The deployed application uses the second modified configuration data to generate an offer module. The module comprises the display of a download screen to indicate that modified data has been received (shown in FIG. 7*a*), and a job offer information screen (shown in FIG. 7*b*). A taskbar is displayed at the bottom of each of those screens. The taskbar is shown as a user interface element in FIG. 7*c*. Now the user interface element visually displays new user interface navigation data to enable a user to move between one of a plurality of modules: profile, interview, offer, and settings. It can be seen that the user interface navigation data has changed again, this time between the second and third stages.

In this example, the user accepts the offer and the server modifies the configuration data yet again. The server may modify the configuration data automatically in respond to acceptance of the offer or may wait for additional confirmation via a user control device.

FIGS. 8*a* to 8*d* illustrate the deployed application executing during a fourth stage of a series of stages in accordance with third modified configuration data received from the server. The deployed application uses the third modified configuration data to generate an onboarding module. The module comprises the display of a download screen to indicate that modified data has been received (shown in FIG. 8*a*), an employee details screen (shown in FIG. 8*b*) and a welcome screen (shown in FIG. 8*c*). A taskbar is displayed at the bottom of each of those screens. The taskbar is shown as a user interface element in FIG. 8*d*. Now the user interface element visually displays new user interface navigation data to enable a user to move between one of a plurality of modules: profile, onboarding, offer, and settings. It can be seen that the user interface navigation data has changed yet again, this time between the third and fourth stages.

Potential advantages of some embodiments of the present invention are that the user interface in a deployed application can be modified without requiring the user to re-download/install the application, that the user interfaces of deployed applications can be modified from a server, and that the user interfaces of deployed applications can be modified in response to individual user actions or status changes. Some or all of the preceding advantages may in turn provide an improved application execution architecture which enables developers to create dynamic, individualised functionality within deployed applications.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of applicant's general inventive concept.

The invention claimed is:

1. A method for dynamically modifying a user interface of a deployed application, including:
   a) a deployed application executing on a user device in accordance with pre-stored configuration data to provide at least part of the user interface; and
   b) the deployed application receiving modified configuration data from a server;

wherein the at least part of the user interface is modified in accordance with received modified configuration data, the at least part of the user interface includes user interface navigation data, the navigation data includes one stage of a series of stages, the modified configuration data relates to a second stage following the one stage, and the series of stages relate to a recruitment and training journey within an organisation.

2. A method as claimed in claim 1, further including: the server coordinating modification of the configuration data by one of a plurality of user control devices.

3. A method as claimed in claim 2, further including:
the server providing a plurality of options to the one user control device; and
the server receiving selection of one of the options to create the modified configuration data.

4. A method as claimed in claim 1, wherein the at least part of the user interface includes content data.

5. A method as claimed in claim 4, wherein the content data is HTML data requested from one of a plurality of web servers.

6. A method as claimed in claim 1, wherein the navigation data is visually represented as a taskbar.

7. A method as claimed in claim 1, wherein the deployed application is executing on a plurality of devices for a plurality of users, wherein the one stage of the series of stages is provided to the plurality of users, and wherein each subsequent stage of the series of stages is provided to a subset of users of the preceding stage.

8. A method as claimed in claim 1, wherein the configuration data includes defining toggling on or off of pre-stored elements/functionality at the device.

9. A method as claimed in claim 1, wherein the deployed application is a native app.

10. A method as claimed in claim 1, wherein the device is a mobile user device.

11. A method as claimed in claim 1, wherein the deployed application is a human resources application.

12. A user device for dynamically modifying the user interface of a deployed application executing on the user device, including:
a processor;
a memory;
a display apparatus;
an input apparatus;
wherein the user device is configured to perform the method of claim 1.

13. A system for dynamically modifying the user interface of a deployed application, including:
a user device as claimed in claim 12; and
a server configured to transmit the modified configuration data to the deployed application on the user device.

14. A method for dynamically modifying a user interface of a deployed application, including:
a) a deployed application executing on a device in accordance with pre-stored configuration data to provide at least part of the user interface; and
b) the deployed application modifying at least part of the user interface in response to user input;
wherein the at least part of the user interface is user interface navigation data, the navigation data includes one stage of a series of stages, the modified at least part of the user interface relates to a second stage following the one stage, and the series of stages relate to a recruitment and training journey within the organisation.

15. A method as claimed in claim 14, wherein the navigation data is visually represented as a taskbar.

16. A method as claimed in claim 14, wherein the deployed application is executing on a plurality of devices for a plurality of users, wherein the one stage of the series of stages is provided to the plurality of users, and wherein each subsequent stage of the series of stages is provided to a subset of users of the preceding stage.

17. A method as claimed in claim 14, wherein the deployed application is a native app.

18. A method as claimed in claim 14, wherein the device is a mobile user device.

19. A non-transitory computer readable medium configured for storing computer executable instructions for execution by a user device, the computer executable instructions when executed control the user device to at least:
execute a deployed application in accordance with pre-stored configuration data to provide at least part of the user interface;
receive modified configuration data from a server; and
modify the at least part of the user interface in accordance with received modified configuration data, wherein the at least part of the user interface includes user interface navigation data, the navigation data includes one stage of a series of stages, the modified configuration data relates to a second stage following the one stage, and the series of stages relate to a recruitment and training journey within an organisation.

* * * * *